(12) United States Patent
Min et al.

(10) Patent No.: US 9,771,048 B2
(45) Date of Patent: Sep. 26, 2017

(54) AIRBAG APPARATUS FOR PANORAMA ROOF

(71) Applicant: HYUNDAI MOBIS CO., LTD., Seoul (KR)

(72) Inventors: Byung Ho Min, Seoul (KR); Seok Min Lee, Yongin-si (KR); Hae Kwon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/201,793

(22) Filed: Jul. 5, 2016

(65) Prior Publication Data

US 2017/0015269 A1    Jan. 19, 2017

(30) Foreign Application Priority Data

Jul. 13, 2015    (KR) .................. 10-2015-0099413

(51) Int. Cl.
  *B60R 21/2338*    (2011.01)
  *B60R 21/214*    (2011.01)
  *B60R 21/237*    (2006.01)
  *B60R 21/231*    (2011.01)
  *B60R 21/261*    (2011.01)

(52) U.S. Cl.
  CPC ........ *B60R 21/2338* (2013.01); *B60R 21/214* (2013.01); *B60R 21/237* (2013.01); *B60R 2021/23192* (2013.01); *B60R 2021/23386* (2013.01); *B60R 2021/2612* (2013.01)

(58) Field of Classification Search
  CPC ................ B60R 21/213; B60R 21/214; B60R 2021/23192; B60J 7/057; B60J 7/1204
  See application file for complete search history.

(56) References Cited

U.S. PATENT DOCUMENTS

| 2,834,606 | A | * | 5/1958 | Bertrand | ................. | B60R 21/16 206/522 |
| 3,721,468 | A | * | 3/1973 | Burgess | .................. | B60R 21/08 280/749 |
| 5,775,726 | A | * | 7/1998 | Timothy | ............... | B60R 21/013 280/730.1 |
| 6,116,644 | A | * | 9/2000 | Viano | ................... | B60R 21/231 280/728.2 |
| 6,189,960 | B1 | * | 2/2001 | Mumura | ................ | B60J 7/0015 160/7 |

(Continued)

FOREIGN PATENT DOCUMENTS

JP    2015-020509    2/2015

*Primary Examiner* — Barry Gooden, Jr.
(74) *Attorney, Agent, or Firm* — H.C. Park & Associates, PLC

(57) ABSTRACT

An airbag apparatus for a panorama roof includes: an inflator generating gas; a gas guide connected to the inflator so as to receive the gas discharged from the inflator; a tether guide arranged along the longitudinal direction of the panorama roof; an airbag having one side connected to the gas guide so as to receive the gas discharged from the gas guide, arranged at the gas guide in a state where the airbag is folded, and connected to the tether guide so as to shield the panorama roof while being unfolded along the tether guide; a moving member connected to the other side of the airbag, and moved along the tether guide; and a driving unit connected to the moving member, and moving the moving member to fold or unfold the airbag.

10 Claims, 6 Drawing Sheets

(56) References Cited

U.S. PATENT DOCUMENTS

| | | | | |
|---|---|---|---|---|
| 6,502,854 B2 * | 1/2003 | Mueller | ................ | B60R 21/201 |
| | | | | 180/281 |
| 6,783,174 B2 * | 8/2004 | Bohm | .................... | B60J 7/0573 |
| | | | | 296/223 |
| 6,817,626 B2 * | 11/2004 | Boll | ...................... | B60R 21/213 |
| | | | | 280/730.1 |
| 7,648,160 B2 * | 1/2010 | Mori | ................. | B60N 2/42745 |
| | | | | 280/730.1 |
| 8,459,696 B2 * | 6/2013 | Browne | ................ | B60R 21/08 |
| | | | | 180/282 |
| 2003/0052476 A1 * | 3/2003 | Rose | ................... | B60R 21/2171 |
| | | | | 280/730.2 |
| 2004/0066022 A1 * | 4/2004 | Mori | ................. | B60N 2/42745 |
| | | | | 280/730.1 |
| 2009/0102169 A1 * | 4/2009 | Gloeckler | ............. | B60R 21/213 |
| | | | | 280/730.2 |

* cited by examiner

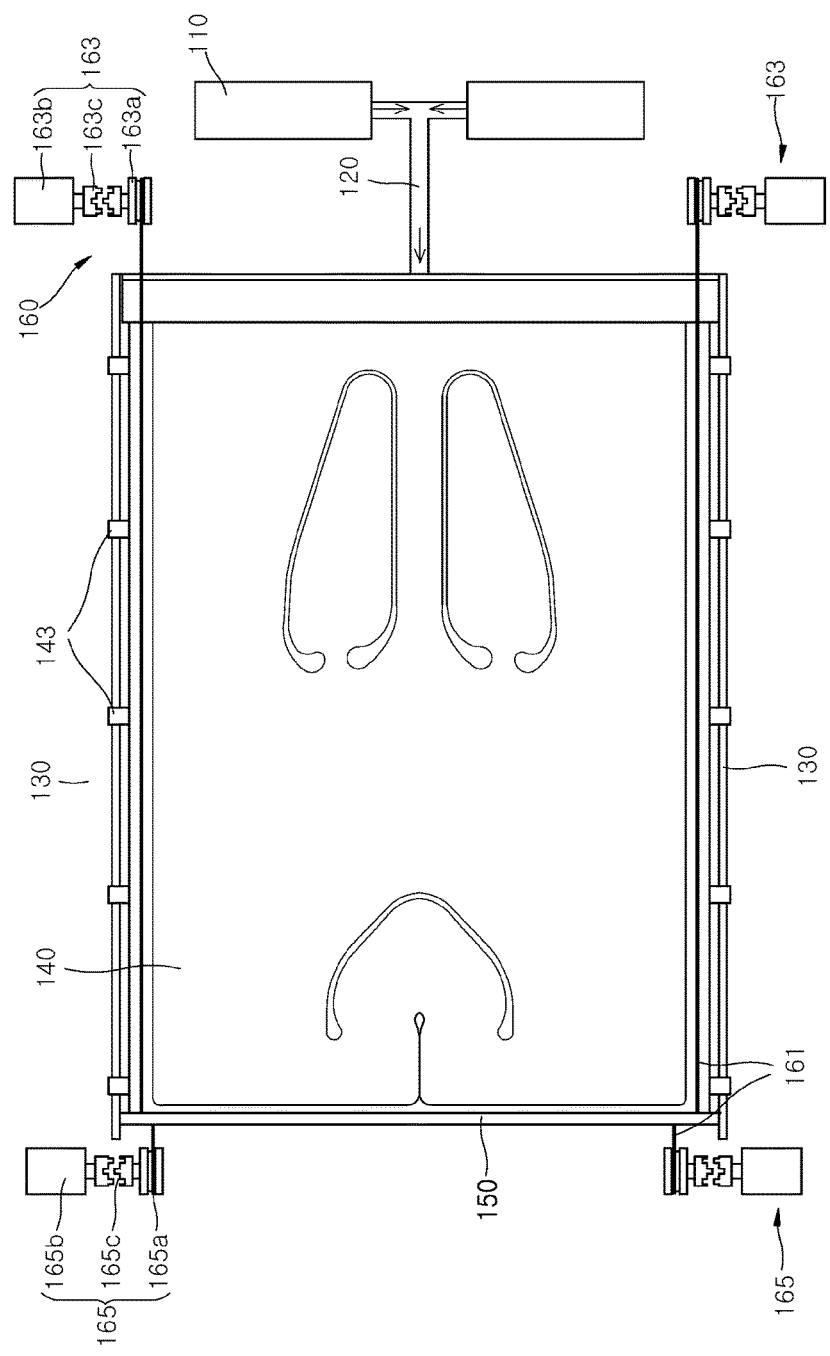

AIRBAG APPARATUS FOR PANORAMA ROOF

CROSS-REFERENCES TO RELATED APPLICATION

The present application claims priority from and the benefit of Korean Patent Application No. 10-2015-0099413, filed on Jul. 13, 2015, which is hereby incorporated by reference for all purposes as if fully set forth herein.

BACKGROUND

Field

The present invention relates to an airbag apparatus for a panorama roof, and more particularly, an airbag apparatus for a panorama roof, which is capable of improving airbag performance at a panorama roof of a vehicle and preventing separation of the airbag.

Discussion of the Background

In general, a vehicle transports passengers. The vehicle includes an airbag apparatus for the safety of a driver or a passenger. For example, airbag apparatuses are installed at the front, both sides, and top of the vehicle. The airbag apparatus includes an inflator and an airbag. When a predetermined magnitude of external shock is applied to the vehicle, gas generated from the inflator is injected to the airbag and expands the airbag. The airbag is rapidly expanded to protect the body of the passenger. When the vehicle is turned over, the airbag installed at the top of the vehicle is expanded. The airbag is deployed toward the center from both sides of the panorama roof.

In the conventional airbag apparatus, however, since the airbag installed at the top of the vehicle is deployed toward the center from both sides of the panorama roof, the central portion of the panorama roof is not completely covered by the airbag. Thus, the possibility that a passenger will be injured is inevitably increased. Furthermore, since the bearing capacity of the airbag is weak at the central portion of the panorama roof, the airbag may be separated from the central portion of the panorama roof.

Thus, there is a demand for a structure capable of solving such a problem.

The related art of the present invention is disclosed in Japanese Patent Publication No. 2015-020509 published on Feb. 2, 2015 and entitled "Center airbag apparatus and passenger protection apparatus for vehicle".

SUMMARY

Embodiments of the present invention are directed to an airbag apparatus for a panorama roof, which is capable of improving airbag performance at a panorama roof of a vehicle, and preventing separation of the airbag.

In one embodiment, an airbag apparatus for a panorama roof may include: an inflator generating gas; a gas guide connected to the inflator so as to receive the gas discharged from the inflator; a tether guide arranged along the longitudinal direction of the panorama roof; an airbag having one side connected to the gas guide so as to receive the gas discharged from the gas guide, arranged at the gas guide in a state where the airbag is folded, and connected to the tether guide so as to shield the panorama roof while being unfolded along the tether guide; a moving member connected to the other side of the airbag, and moved along the tether guide; and a driving unit connected to the moving member, and moving the moving member to fold or unfold the airbag.

The driving unit may include: a wire connected to the moving member, and arranged in parallel to the tether guide; a first winding part connected to one side of the wire, and winding the wire to move the moving member toward the gas guide; and a second winding part connected to the other side of the wire, and winding the wires to move the moving member toward the opposite side of the gas guide.

The wire may be connected to either side of the moving member, and arranged in parallel to the tether guide.

The wire may be passed through the airbag at either side of the airbag in a state where the airbag is folded in a zigzag shape.

Two first winding parts may be connected to the respective wires.

When the first winding parts move the moving member toward the gas guide, the airbag may be folded in a zigzag shape by the moving member.

Two second winding parts may be connected to the respective wires.

The first winding part may wind the wire to fold the airbag, and the second winding part may wind the wire to shield the panorama roof as the airbag is unfolded.

The tether guide may be arranged at either side of the panorama roof so as to support either side of the airbag.

A plurality of guide tabs may be connected to either side of the airbag, and the tether guide may be inserted into the plurality of guide tabs.

The moving member may be arranged perpendicular to the tether guide.

BRIEF DESCRIPTION OF THE DRAWINGS

FIG. 6 is a plan view illustrating a state in which the airbag is expanded by gas in the airbag apparatus for a panorama roof in accordance with the embodiment of the present invention.

DETAILED DESCRIPTION OF THE ILLUSTRATED EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
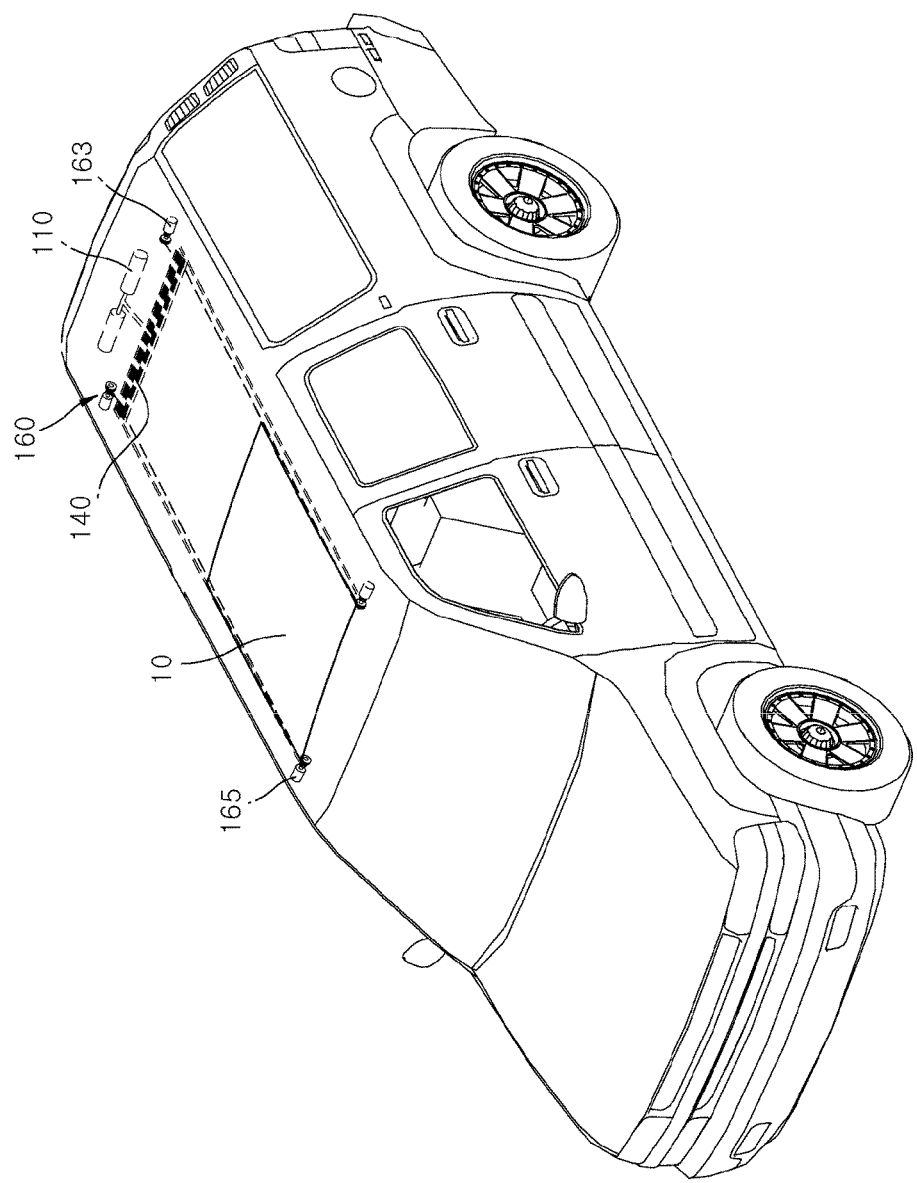
FIG. 1 is a perspective view of a vehicle in which an airbag apparatus for a panorama roof in accordance with an embodiment of the present invention is installed.
Figure 2:
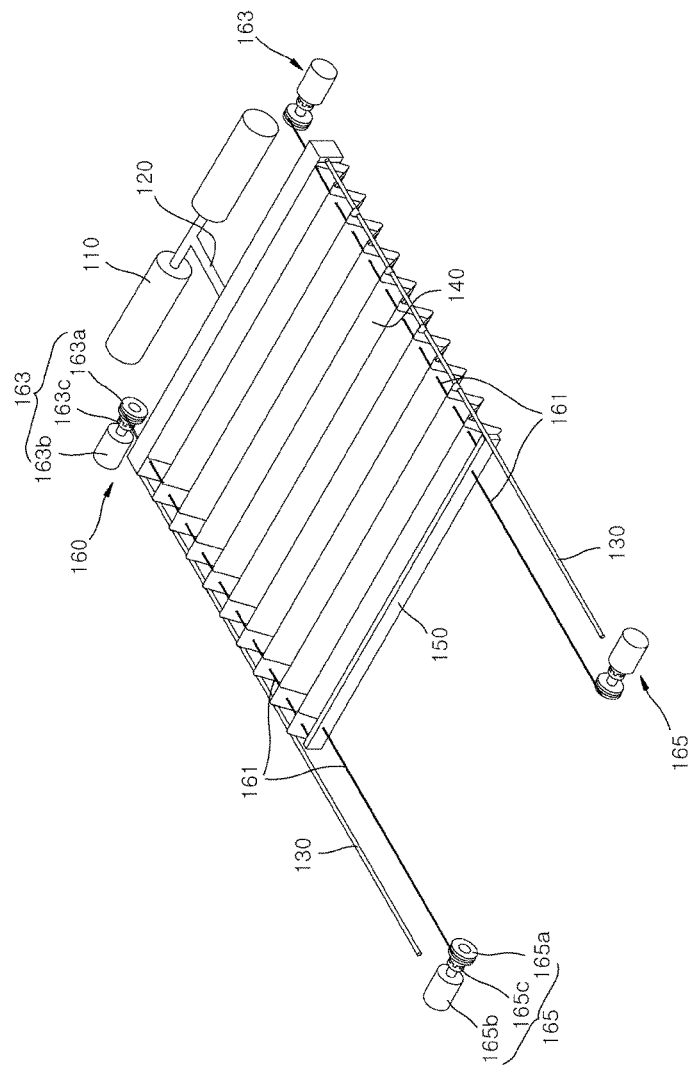
FIG. 2 is a perspective view of the airbag apparatus for a panorama roof in accordance with the embodiment of the present invention.
Figure 3:
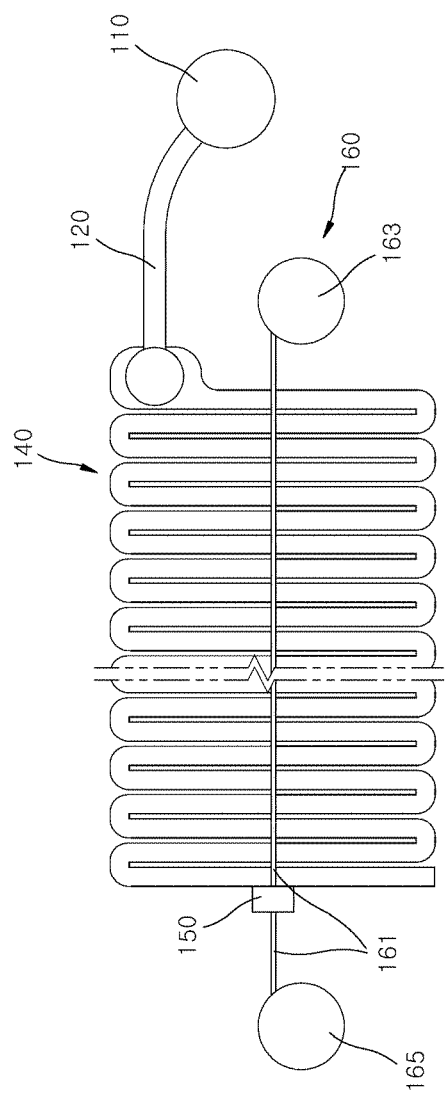
FIG. 3 is a side view of the airbag apparatus for a panorama roof in accordance with the embodiment of the present invention.
Figure 4:
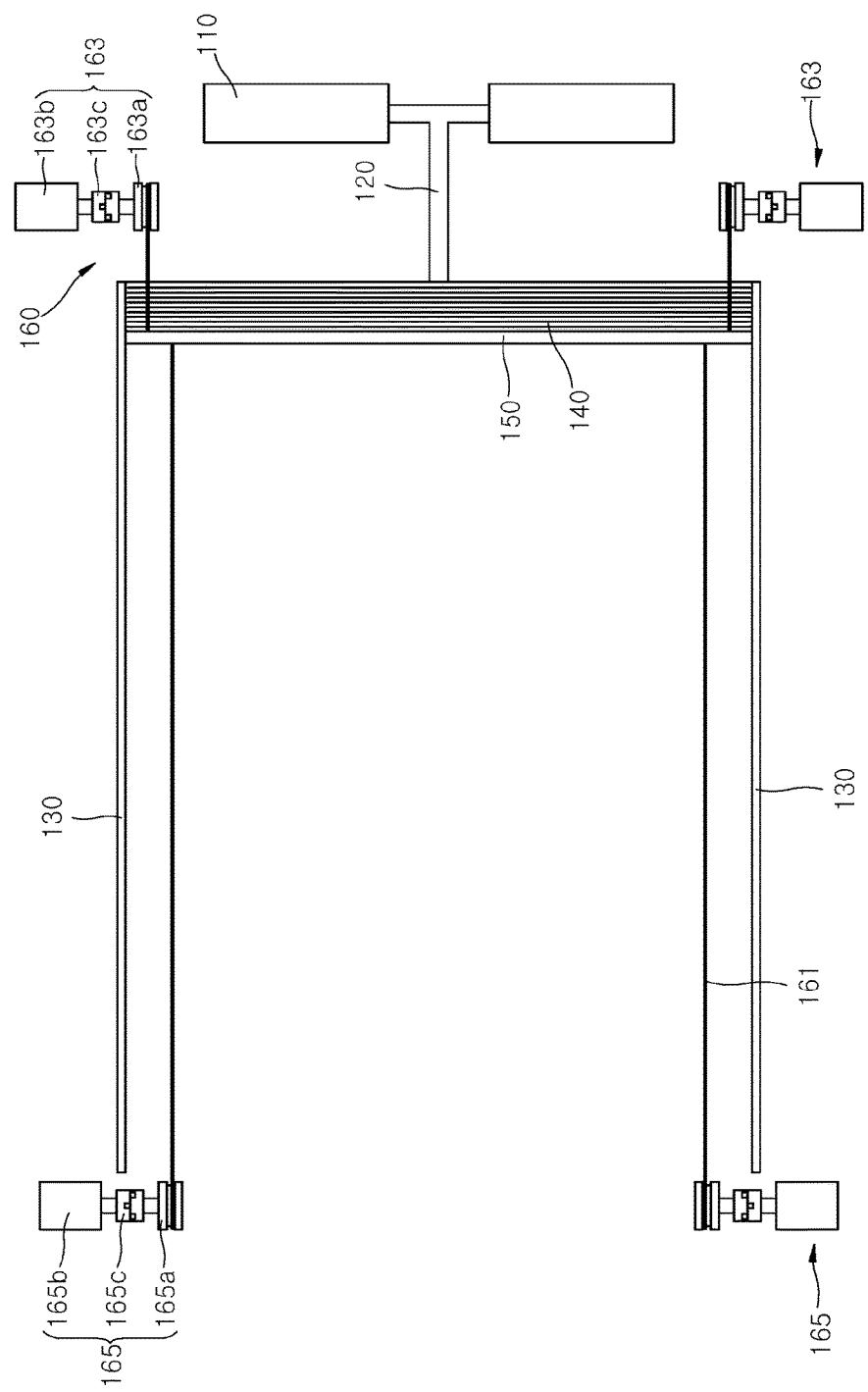
FIG. 4 is a plan view illustrating a state in which an airbag is folded in the airbag apparatus for a panorama roof in accordance with the embodiment of the present invention.
Figure 5:
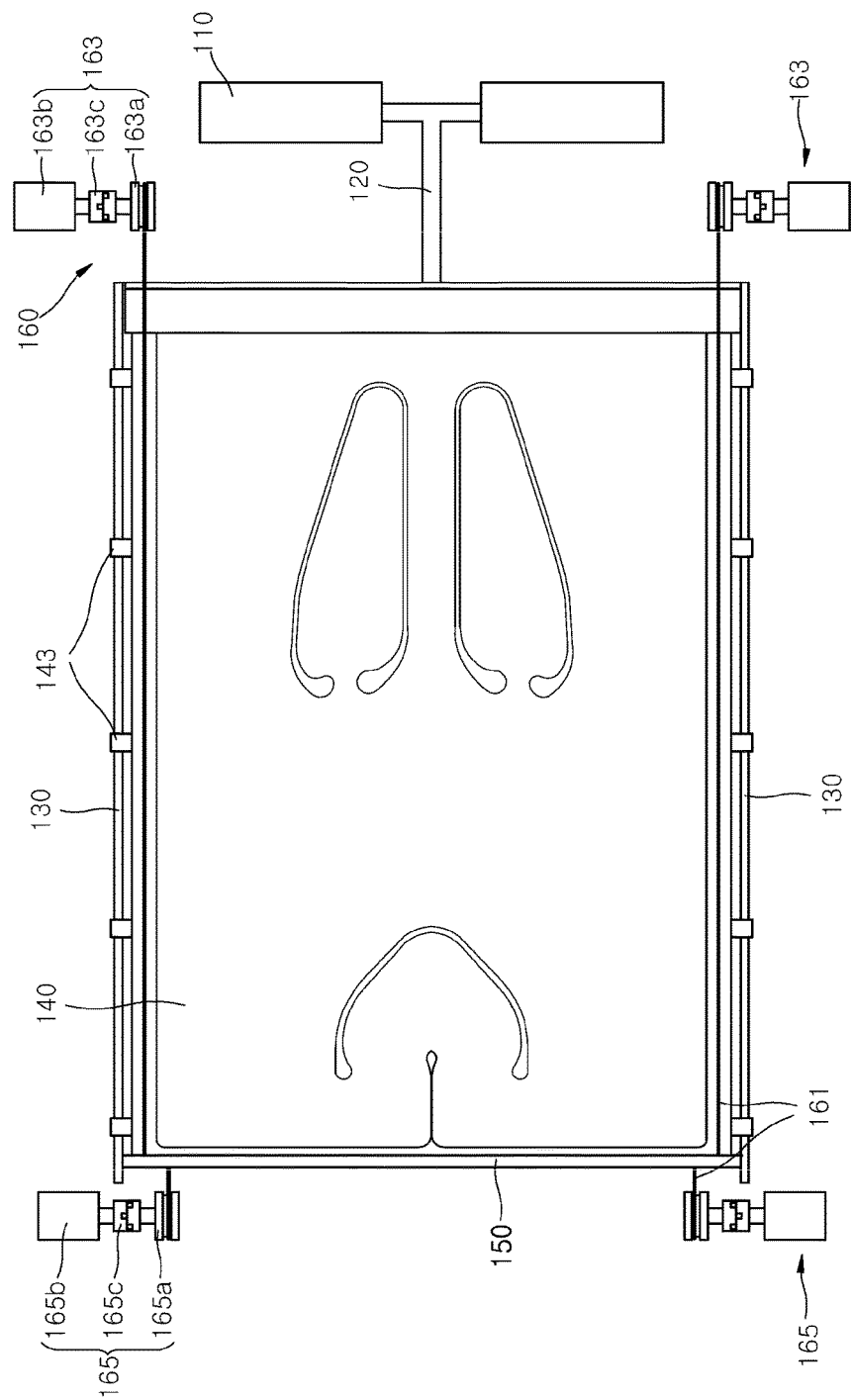
FIG. 5 is a plan view illustrating a state in which the airbag is unfolded by a driving unit in the airbag apparatus for a panorama roof in accordance with the embodiment of the present invention

FIG. 1 is a perspective view of a vehicle in which an airbag apparatus for a panorama roof in accordance with an embodiment of the present invention is installed, FIG. 2 is a perspective view of the airbag apparatus for a panorama roof in accordance with the embodiment of the present invention, FIG. 3 is a side view of the airbag apparatus for a panorama roof in accordance with the embodiment of the present invention, FIG. 4 is a plan view illustrating a state in which an airbag is folded in the airbag apparatus for a panorama roof in accordance with the embodiment of the present invention, and FIG. 5 is a plan view illustrating a state in which the airbag is unfolded by a driving unit in the airbag apparatus for a panorama roof in accordance with the embodiment of the present invention.

Referring to FIGS. 1 to 5, the airbag apparatus for a panorama roof in accordance with the embodiment of the present invention may include an inflator 110, a gas guide 120, a pair of tether guides 130, an airbag 140, a moving member 150 and a driving unit 160.

The inflator 110 may be installed at the top of a vehicle. The inflator 110 may be arranged in parallel to the widthwise direction of the vehicle. The inflator 110 may include an ignition device (not illustrated). The ignition device may ignite powder to generate gas.

The gas guide 120 may be connected to the inflator 110 so as to receive gas discharged from the inflator 110. At this time, the gas guide 120 may be extended in a direction perpendicular to the inflator 110 from the center of the inflator 110.

The tether guides 130 may be arranged along the longitudinal direction of the panorama roof 10. At this time, the tether guides 130 may be arranged at both sides of the panorama roof 10 so as to support both sides of the airbag 140, respectively. Since the tether guides 130 support both sides of the airbag 140, the tether guides 130 may stably support both sides of the airbag 140 when the airbag 140 is expanded.

A plurality of guide tabs 143 may be connected to either side of the airbag 140 in the widthwise direction of the vehicle, and the tether guide 130 may be inserted into the guide tabs 143. Since the plurality of guide tabs 143 are inserted into the tether guides 130, either side of the airbag 140 may be stably supported by the tether guide 130 through the guide tabs 143. When the airbag 140 is folded or unfolded, the guide tabs 143 may be moved along the tether guide 130.

A wire 161 may be passed through the airbag 140 at either side of the airbag 140 in a state where the airbag 140 is folded in a zigzag shape. Thus, since the wire 161 is passed through a plurality of spots at even intervals in the airbag 140, either side of the airbag 140 may be moved along the wire 161. Thus, the airbag 140 may be easily folded or unfolded.

One side of the airbag 140 at the rear of the vehicle may be connected to the gas guide 120 so as to receive gas discharged from the gas guide 120, and the airbag 140 may be arranged at the gas guide 120 when the airbag 140 is folded in a zigzag shape. Both sides of the airbag 140 in the widthwise direction of the vehicle may be connected to the tether guides 130 so as to shield the panorama roof 10 while being moved along the tether guides 130. Since the airbag 140 is deployed to shield the panorama roof 10, the entire panorama roof 10 may be shielded by the airbag 140. Thus, the performance of the airbag 140 in the entire panorama roof 10 can be improved, and the separation of the airbag 140 from the panorama roof 10 can be prevented.

The moving member 150 may be connected to the other side of the airbag 140, and moved along the tether guides 130. The moving member 150 may be formed in the shape of a rod or plate arranged in parallel to the widthwise direction of the vehicle. Furthermore, the moving member 150 may be arranged perpendicular to the tether guide 130. The other side of the airbag 140 may be supported by the moving member 150.

The driving unit 160 may be connected to the moving member 150, and move the moving member 150 to fold or unfold the airbag 140. Since the driving unit 160 moves the moving member 150 to fold or unfold the airbag 140, the driving unit 160 may unfold the airbag 140 to shield the sunlight, when a shade is needed on the panorama roof 10. Thus, the driving unit 160 may be driven to shield the panorama roof 10.

The driving unit 160 may include a pair of wires 161, a pair of first winding parts 163 and a pair of second winding parts 165.

The pair of wires 161 may be connected to the moving member 150, and arranged in parallel to the tether guides 130. The wires 161 may be connected to both sides of the moving member 150, and arranged in parallel to the tether guides 130. Thus, since both sides of the moving member 150 are supported by the wires 161, the moving member 150 may be stably moved in the direction parallel to the tether guides 130.

The pair of first winding parts 163 may be connected to one sides of the wires 161 at the rear of the vehicle, and wind the wire 161 to move the moving member 150 toward the gas guide 120. When the first winding parts 163 move the moving member 150 toward the gas guide 120, the airbag 140 may be folded in a zigzag shape by the moving member 150.

The pair of first winding parts 163 may be connected to the pair of wires 161. Since the first winding parts 163 are connected to the two wires 161, respectively, each of the wires 161 may be controlled by the corresponding first winding part 163.

The first winding part 163 may include a first pulley 163a having the wire 161 wound therearound and a first motor 163b axially coupled to the center of rotation of the first pulley 163a. Between the first pulley 163a and the shaft of the first motor 163b, a first clutch 163c may be installed to block and stop power transmission. As the first motor 163b is driven, the first pulley 163a may be rotated to wind or unwind the wire 161. The first clutch 163c may separate the first motor 163b and the first pulley 163a from each other, such that the first pulley 163a freely rotates when the airbag 140 is expanded by gas.

The pair of second winding parts 165 may be connected to the other sides of the wires 161, and wind the wires 161 to move the moving member 150 toward the opposite side of the gas guide 120. At this time, since the moving member 150 is moved toward the opposite side of the gas guide 120, the airbag 140 may be unfolded to shield the panorama roof 10.

The pair of second winding parts 165 may be connected to the respective wires 161. Since the second winding parts 165 are connected to the two wires 161, respectively, each of the wires 161 may be controlled by the corresponding second winding part 165.

The second winding part 165 may include a second pulley 165a having the wire 161 wound therearound and a second motor 165b axially coupled to the center of rotation of the second pulley 165a. Between the second pulley 165a and the shaft of the second motor 165b, a second clutch 165c may be installed to block and stop power transmission. As the second motor 165b is driven, the second pulley 165a may be rotated to wind or unwind the wire 161. The second clutch 165c may separate the second motor 165b and the second pulley 165a from each other, such that the second pulley 165a freely rotates when the airbag 140 is expanded by gas.

The first winding part 163 may wind the wire 161 to fold the airbag 140 in a zigzag shape, and the second winding part 165 may wind the wire 161 to shield the panorama roof 10. At this time, when the first winding part 163 is rotated to wind the wire 161, the second motor 165b may be rotated to release the wire. Furthermore, when the second winding part 165 is rotated to wind the wire 161, the second motor 165b may be rotated to release the wire. As the first and second winding parts 163 and 165 are driven, the airbag 140 may be unfolded to cover the panorama roof 10. Thus, the airbag 140 may serve as a shade.

The operation of the airbag apparatus for a panorama roof in accordance with the embodiment of the present invention will be described as follows.

FIG. 4 is a plan view illustrating a state in which the airbag is folded in the airbag apparatus for a panorama roof in accordance with the embodiment of the present invention, and FIG. 5 is a plan view illustrating a state in which the airbag is unfolded by the driving unit in the airbag apparatus for a panorama roof in accordance with the embodiment of to the present invention.

Referring to FIGS. 4 and 5, when a shade is needed on the panorama roof 10 while the vehicle is operated, a shade mode may be selected through an input unit (not illustrated). In this case, the second winding part 165 may be driven to wind the wire 161, and the first winding part 163 may be driven to unwind the wire 161. As the first and second winding parts 163 and 165 are driven, the folded airbag 140 may be unfolded to shield the panorama roof 10. At this time, since the wires 161 are passed through the airbag 140 at both sides of the airbag 140, the both sides of the airbag 140 may be moved while sliding along the wires 161. Thus, since both sides of the airbag 140 are supported by the wires 161, the airbag 140 can be prevented from drooping when the airbag 140 is unfolded. Since the airbag 140 is unfolded to shield the panorama roof 10, the airbag 140 can shield the sunlight transmitting the panorama roof 10.

Furthermore, when no shade is needed on the panorama roof 10, a shade release mode may be selected through the input unit. In this case, the first winding part 163 may be driven to wind the wire 161, and the second winding part 165 may be driven to unwind the wire 161. As the first and second winding parts 163 and 165 are driven, the unfolded airbag 140 may be folded. At this time, since the wires 161 are passed through both sides of the airbag 140, the airbag 140 can be prevented from drooping when the airbag 140 is folded. Furthermore, the airbag 140 may be easily folded in a zigzag shape.

FIG. 6 is a plan view illustrating a state in which the airbag is expanded by gas in the airbag apparatus for a panorama roof in accordance with the embodiment of the present invention.

Referring to FIG. 6, when external shock is applied to the vehicle due to an overturn or the like, the ignition device of the inflator 110 may ignite powder to generate gas. The gas of the inflator 110 may be supplied to the airbag 140 through the gas guide 120. While the airbag 140 is rapidly expanded by the gas, the airbag 140 may be unfolded to the cover the panorama roof 10.

Simultaneously, the first clutch 163c of the first winding part 163 may be controlled to remove the restriction of the first pulley 163a and the first motor 163b. Furthermore, the second clutch 165c of the second winding part 165 may be controlled to remove the restriction of the second pulley 165a and the second motor 165b. Since the first and second clutches 163c and 165c remove the restrictions of the first and second pulleys 163a and 165a, it is possible to suppress resistance caused by the wire 161 when the airbag 140 is unfolded. Furthermore, although the airbag 140 is unfolded, it is possible to prevent the damage of the wire 161.

Since the airbag 140 shields the entire panorama roof 100 while being expanded by the gas, the performance of the airbag 140 can be improved at the panorama roof of the vehicle. Furthermore, since both sides of the airbag 140 are supported by the tether guides 130 and the wires 161, the separation of the airbag 140 from the panorama roof 10 can be prevented.

Furthermore, since the airbag 140 is unfolded by the driving unit 160 so as to shield the panorama roof 10, the airbag 140 can serve as a shade of the panorama roof 10.

Furthermore, since the wires 161 are passed through the airbag 140 at both sides of the airbag 140, the airbag 140 can be easily folded or unfolded while being moved along the wires 161. Furthermore, since the wires 161 support both sides of the airbag 140, respectively, the airbag 140 can be prevented from drooping when the airbag 140 is folded and unfolded.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus for a panorama roof, comprising:
    an inflator generating gas;
    a gas guide connected to the inflator so as to receive the gas discharged from the inflator;
    a tether guide arranged along the longitudinal direction of the panorama roof;
    an airbag having one side connected to the gas guide so as to receive the gas discharged from the gas guide, arranged at the gas guide in a state where the airbag is folded, and connected to the tether guide so as to shield the panorama roof while being unfolded along the tether guide;
    a moving member connected to another side of the airbag, and moved along the tether guide; and
    a driving unit connected to the moving member, and moving the moving member to fold or unfold the airbag, the driving unit comprising:
        a wire connected to the moving member, and arranged in parallel to the tether guide;
        a first winding part connected to one side of the wire, and winding the wire to move the moving member toward the gas guide; and
        a second winding part connected to another side of the wire, and winding the wire to move the moving member away from the gas guide.

2. The airbag apparatus of claim 1, wherein the moving member is arranged perpendicular to the tether guide.

3. The airbag apparatus of claim 1, wherein the tether guide is arranged at either side of the panorama roof so as to support either side of the airbag.

4. The airbag apparatus of claim 3, wherein a plurality of guide tabs are connected to either one of the sides of the airbag, and
    the tether guide is inserted into the plurality of guide tabs.

5. The airbag apparatus of claim 1, wherein the wire is connected to either side of the moving member, and arranged in parallel to the tether guide.

6. The airbag apparatus of claim 5, wherein the wire is passed through the airbag at either side of the airbag in a state where the airbag is folded in a zigzag shape.

7. The airbag apparatus of claim 5, wherein two second winding parts are connected to the respective wires.

8. The airbag apparatus of claim 5, wherein the first winding part winds the wire to fold the airbag, and
   the second winding part winds the wire to shield the panorama roof as the airbag is unfolded.

9. The airbag apparatus of claim 5, wherein two first winding parts are connected to the respective wires.

10. The airbag apparatus of claim 9, wherein when the first winding parts move the moving member toward the gas guide, the airbag is folded in a zigzag shape by the moving member.

\* \* \* \* \*